United States Patent [19]
Jakobs

[11] Patent Number: 6,097,373
[45] Date of Patent: Aug. 1, 2000

[54] LASER ACTUATED KEYBOARD SYSTEM

[75] Inventor: Thomas Jakobs, Alma, Ark.

[73] Assignee: InvoTek Corporation, Alma, Ark.

[21] Appl. No.: 08/958,978

[22] Filed: Oct. 28, 1997

[51] Int. Cl.$^7$ ...................................................... G09G 5/00
[52] U.S. Cl. ........................... 345/168; 345/158; 345/169
[58] Field of Search ................................... 345/168, 169, 345/156, 157, 158, 7, 180; 341/22, 20

[56] References Cited

U.S. PATENT DOCUMENTS

| | | |
|---|---|---|
| 3,651,508 | 3/1972 | Scarborough, Jr. et al. . |
| 3,697,760 | 10/1972 | Biet et al. . |
| 3,735,395 | 5/1973 | Iwabuchi et al. . |
| 3,885,096 | 5/1975 | Inuiya ............................................ 345/7 |
| 4,504,740 | 3/1985 | Gillessen et al. . |
| 4,565,999 | 1/1986 | King et al. . |
| 4,654,648 | 3/1987 | Herrington et al. . |
| 4,713,535 | 12/1987 | Rhoades .................................. 345/168 |
| 4,796,019 | 1/1989 | Auerbach . |
| 5,030,840 | 7/1991 | Sommen . |
| 5,115,230 | 5/1992 | Smoot ..................................... 345/157 |
| 5,581,323 | 12/1996 | Suzuki et al. . |
| 5,686,942 | 11/1997 | Ball . |
| 5,907,723 | 5/1999 | Inoue . |

OTHER PUBLICATIONS

Beverly A. Fraser, et al., *Development of a physical characteristics assessment (PCA): a checklist for determining appropriate computer access for individuals with cerebral palsy*; Assistive Technology v. 7, 1995 pp. 26–33 (Abstract Only).

T.Donnelly, et al.,*Laser–operated mouse for a physically disabled child*; IEEE Colloquium (Digest) Proceedings of the 1997 IEE Colloquium on Computers in the Service of Mankind (Abstract Only).

Alice Smith, et al., *Multimodal input for computer access and augmentative communication*Annual ACM Conference on Assistive Technologies, Proceedings of the 1996 2$^{nd}$ ACM Conference on Assistive Technologies, pp. 80–85 (Abstract Only).

Seigou Yusada, et al., *Communication system for people with physical disability using voice recognizer*, IEICE Transactions on Fundamentals of Electronics, Communications and Computer Sciences Proceedings of the 1997 International Technical Conference on Circuits/Systems, Computers and Communications, pp. 1097–1104 (Abstract Only).

Sandy Ressler, et al., *Making VRML accessible for people with disabilities*, Annual ACM Conference on Assistive Technologies, Proceedings of the 1998 3$^{rd}$ International ACM Conference on Assistive Technologies, ASSETS '98 , pp. 144–148 (Abstract Only).

Perri Stern, et al., *Interdisciplinary problem–based learning project for assistive technology education*, Assistive Technology v 9n2 1997 pp. 152–157 (Abstract Only).

T. Donnelly, et al., *Laser–operated mouse for a physically disabled child*, IEE Colloquium (Digest) Proceedings of the 1997 IEE Colloquium on Computers of Mankind, 1997 London, (Abstract Only).

(List continued on next page.)

*Primary Examiner*—Xiao Wu
*Attorney, Agent, or Firm*—Ronald P. Kananen; Rader, Fishman & Grauer

[57] ABSTRACT

A laser actuated keyboard system (10) includes a laser pointer (12) mounted on an adjustable headband (14) for directing a collimated beam (16) onto a laser keyboard (18) defined by an array of photosensors (58) that are intended to be illuminated by the user-targeted beam (16). During a laser acquisition mode, the laser pointer (12) output is controlled to provide a relatively retina-safe output and during the captured signal mode, the laser pointer (12) output is controlled to provide a higher-power mode sufficient to be easily seen. During the higher-power mode, the laser pointer (12) is modulated at a selected frequency to assist the laser keyboard (18) in discriminating against common background light. A successful keypress is declared when the beam (16) illuminates a targeted area for a selected percentage of a pre-determined dwell period.

24 Claims, 9 Drawing Sheets

OTHER PUBLICATIONS

B, Baudel–Cantegrit, *Communication aids in education: Adapted hypermedia system*, 13th Annual Conference on Engineering in Medicine and Biology Society, pp. 1385–1386 (Abstract Only).

F.S. Grodzinsky, *Computer access for students with disabilities: An Adaptive Technology Laboratory*, SIFCSE Technical Symposium on Computer Science Education, 1997, pp. 292–295 (Abstract Only).

Michael G. Paciello, *Access to electronic information by people with disabilities*, IEEE Computer Society International Conference, 1997 pp. 235–239 (Abstract Only).

S.P. Casali et al. *Eddects of physical attributes of computers interface design on novice and experienced performance of users with physical disabilities*, Proceedings of the 37th Annual Meeting of the Human Factors and Ergonomics Society, 1993, pp. 844–853 (Abstract Only).

Harry J. Murphy, *Programs on the Center on Disabilities at California State University*, Northridge, IEEE IEEE Los Alamitos, Ca., 1996, pp. 118–120 (Abstract Only).

A. Kohama, *Supports for students with disability through technology—challenge at California State University, Northridge*, IEEE IEEE Los Alamitos, Ca., 1996, pp. 121–122 (Abstract Only).

C. Brown, *Assistive technology computers and persons with disabilities*, Communications of the ACM v 35 n 5 May 1992, pp. 36–45 (Abstract Only).

James S. Lynds, DARCI TOO—*a computer input device for people with disabilities*, published by IEEE Los Alamitos, Ca., 1992, pp. 110–112 (Abstract Only).

Arjan S. Khalsa, *IntelliKeys. The smart keyboard*, Johns Hopkins APL Technical Digest v 13 n 4, 1992 pp. 466–470 (Abstract Only).

*Proceedings of the Johns Hopkins National Search for Computing Applications to Assist Person with Disabilities*, Proceedings of the John Hopkins National Search for Computing Applications to Assist Persons with Disabilities, 1992 (Abstract Only).

G. Fraser Shein et al., *Overview of human–computer interaction techniques for people with physical disabilities*, International Journal of Industrial Ergonomics v. 9 n 2, 1992 pp. 171–181 (Abstract Only).

Sharon August, et al., *Human factors approach to adapted access device prescription and customization*, Journal of Rehabilitation Research & Development, v. 29 n 4 1992, pp. 64–77 (Abstract Only).

T.V. Raman, *Emacspeak—a speech interface*, Conference on Human Factors in Computing Systems—Proceedings of the 1996 Conference on Human Factors in Computing Systems, 1996, pp. 66–71 (Abstract Only).

Alice Smith, *Multimodal input for computer access and augmentative communication*, Proceedings of the 1996 2nd ACM Conference on Assistive Technologies, 1996, pp. 80–85 (Abstract Only).

William J. Hallahan, *DECtalk software: text–to–speech technology and implementation*, Digital Technical Journal v 7 n 4 1995 Digital Equipment Corp Maynard Ma., pp. 5–19 (Abstract Only).

Alan Edwards, et al., *Enabling technology for users with special needs*, Conference Proceedings of the Conference on Human Factors in Computing Systems, 1995 pp. 351–352 (Abstract Only).

Ability Research, Inc., PO Box 1721, Minnetonka, MN 55345; LightBoard/LightSwitch specificaion sheet.

Prente Romich Co., 1022 Heyl Road, Wooster, OH 44691; 1994–1995 Catalog; p. 30 "Headmaster Plus".

IntelliTools, Inc., 55 Leveroni Court, Suite 9, Novato, CA 94949; Fall 1996 Catalog; p. 4 "IntelliKeys"; p. 19 "ClickIt".

Don Johnston, Inc., 1000 N. Rand Road, Building 115, PO Box 639, Wauconda, IL 60084–0639; 1995 Catalog; p. 34 "IntelliKeys".

Technical Report, vol. 12, Mar. 1996, "Laser Pointers: Are They Safe for Use by Children?" Gregory J. Salamo and Thomas Jakobs.

LASER ACTUATED KEYBOARD SYSTEM

BACKGROUND OF THE INVENTION

The present invention relates to a laser actuated keyboard system, and, more particularly, to a laser keyboard system intended for use by persons whose disability prevents them from using conventional computer keyboards.

Various input devices have been developed to assist the disabled to control computers. Such devices include light-actuated keyboards and switches, joystick-type controllers, wand-type controllers, and various switches that respond to low-force actuation, including pneumatic actuation.

Light-actuated keyboards have typically been defined by an array of photo-responsive sensors that each correspond to a user-depressable key on a conventional computer keyboard. A light source is carried by a headmounted headband and pointed by the user toward various light-responsive surfaces to spell-out commands that are then entered into the computer. In order to facilitate the operation of the computer, software macro programs are used in conjunction with the keyboard to store a character or a character string to a particular 'key' so that actuation of that key will expand the pre-programmed macro and input the pre-stored character or character string into the computer. Additionally, these light-actuated keyboards typically use replaceable templates or overlays so that different graphic indicia can be associated with each photo-responsive area of the keyboard.

More recently, laser diodes have been used as the pointable light source. While lasers provided well collimated light beams, their relatively high output has been a source of concern. While lasers provide well-collimated light beams, the intensity of consumer-grade lasers has been an eye-safety concern, especially when used by children. While the luminous flux of the laser pointer can be reduced to relatively low levels, such low levels require sensitive photo-responsive cells on the keyboard which, in turn, can lower the signal-to-noise ratio to cause spurious actuation in response to background light.

SUMMARY OF THE INVENTION

In view of the above, it is an object of the present invention, among others, to provide a laser actuated keyboard system that uses a collimated laser beam that is sufficient to actuate photoresponsive sensors on an input device and yet operate in a manner that is reasonably retina-safe.

It is another object of the present invention to provide a laser actuated keyboard system that uses a laser beam having a low-power mode and a higher-power mode; the higher-power mode being used to target receptors photoresponsive areas on the keyboard.

It is still another object of the present invention to provide a laser actuated keyboard system having a laser acquisition mode in which the laser beam operates in a low-power, retina-safe mode and a beam locked-on mode in which the laser beam operates in a higher-power mode sufficient to be easily seen by the keyboard user.

It is a further object of the present invention to provide a laser actuated keyboard system in which the laser beam is modulated so as to enable the system to distinguish the laser beam from other modulated or intensity-varying light sources that may illuminate the keyboard.

In view of these objects, and others, the present invention provides a laser actuated keyboard system preferentially designed for use by a disabled person in which a laser light source is adjustably secured to a headband. A light-responsive keyboard includes an array of photoresponsive sensors that are intended to be selectively illuminated by the user to input commands into an associated computer. The keyboard includes provisions for inserting a light-transmitting overlay over the photoresponsive areas; the overlay carries various alpha/numeric symbols or other graphic representations of the underlying functions/responses caused by the illumination of those alpha/numeric symbols or graphics. The laser actuated system includes a key macro program by which a single character or different user-selectable characters or character strings can be associated with a particular photoresponsive area of the keyboard. In the preferred embodiment, the initial light-entry surface of the keyboard is frosted to minimize the danger of reflected light from the high intensity laser mode. As the light passes through the frosted surface it illuminates the alpha/numeric symbols or graphics overlay. A portion of the light from the laser is transmitted through the combination of the overlay and an optical filter, effectively enlarging the beam presented at the photoresponsive surface, assuring that any under-sensitive or "dead" areas of the photoresponsive surface will not impair overall operation of the system. The optical filter also reduces the effects of light from sources other than the laser.

The laser is controlled to have at least two power levels: a low-power, reasonably retina-safe mode and a higher-power mode for illuminating targeted areas of the keyboard. When the system is in a laser acquisition mode, the power output of the laser is sufficiently low to be retina-safe and can be pointed by the user in any direction. When the low-power beam is detected by the keyboard, a laser locked-in mode is actuated and the power level of the laser is increased to a higher-power level sufficient to be easily seen by the keyboard user. In the event that the laser locked-in mode is interrupted, the system re-enters the laser acquisition mode in which laser power output is reduced to the retina-safe level.

The output of the laser is preferentially modulated at some frequency that is higher that those frequencies normally encountered in interior lighting systems. Appropriate filtering is provided within the signal processing pathway to enable the keyboard system to discriminate the laser signal from any other environmental light sources that may be illuminating the photoresponsive devices of the laser keyboard.

The present invention advantageously provides a laser actuated keyboard system in which retina-safe operation is assured by providing two different luminous power levels and in which a high signal-to-noise ratio is achieved by modulating the output of the laser pointer.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
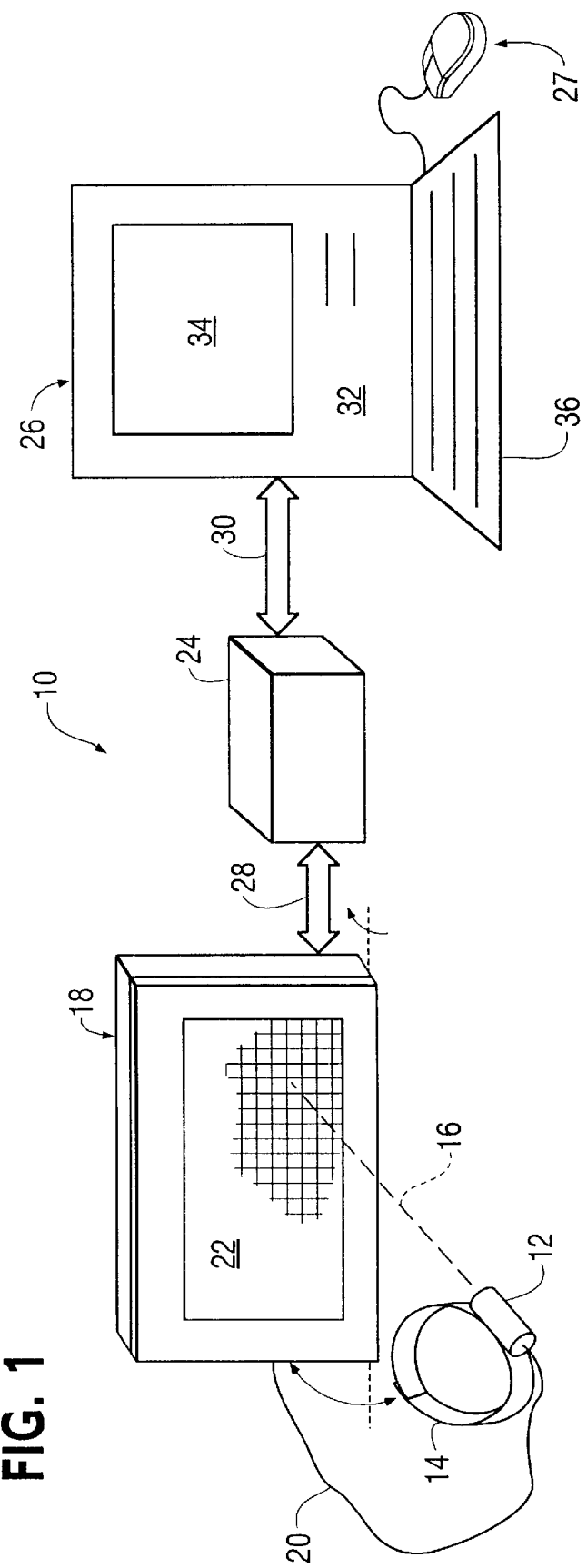
FIG. 1 is a schematic view of a laser actuated keyboard system in accordance with the present invention.

A laser actuated keyboard system in accordance with the present invention is shown in FIG. 1 and designated generally therein by the reference character 10. As shown, the system 10 includes a laser pointer 12 mounted on an adjustable headband 14 for directing a collimated beam 16 (dotted-line illustration) onto a laser keyboard 18 to illuminate selected areas thereof. An electrical power/control cord 20 provides electrical energy to the laser pointer 12 to provide one of several pulse-modulated output levels as explained more fully below. The laser keyboard 18 includes a light-receiving surface 22, composed of a rectangular array of light sensors, that is intended to be illuminated by the user-targeted beam 16 of the laser pointer 12. An interface unit 24 connects the laser keyboard 18 to a system computer 26 via a bidirectional communication path 28 and a bi-directional communication path 30, as shown in generic fashion. The system computer 26 includes a system unit 32, a video display 34, a keyboard 36, and a computer mouse. In the preferred embodiment, the system computer 26 is a MacIntosh or Powerbook computer manufactured by Apple Computer of Cupertino, Calif. or a compatible general purpose computer. In the case where a MacIntosh computer is used as the system computer, the bi-directional communication path 30 can conform to the Apple Desktop Bus protocol (ADB). As can be appreciated, common personal computers, including those operating under the Microsoft Windows operating systems and their communications protocols, such as the PS/2 keyboard interface standard, are equally suited. The interface unit 24, which is shown as a separate component in the preferred embodiment, can be integrated into or otherwise combined with the laser keyboard 18.

Figure 12:
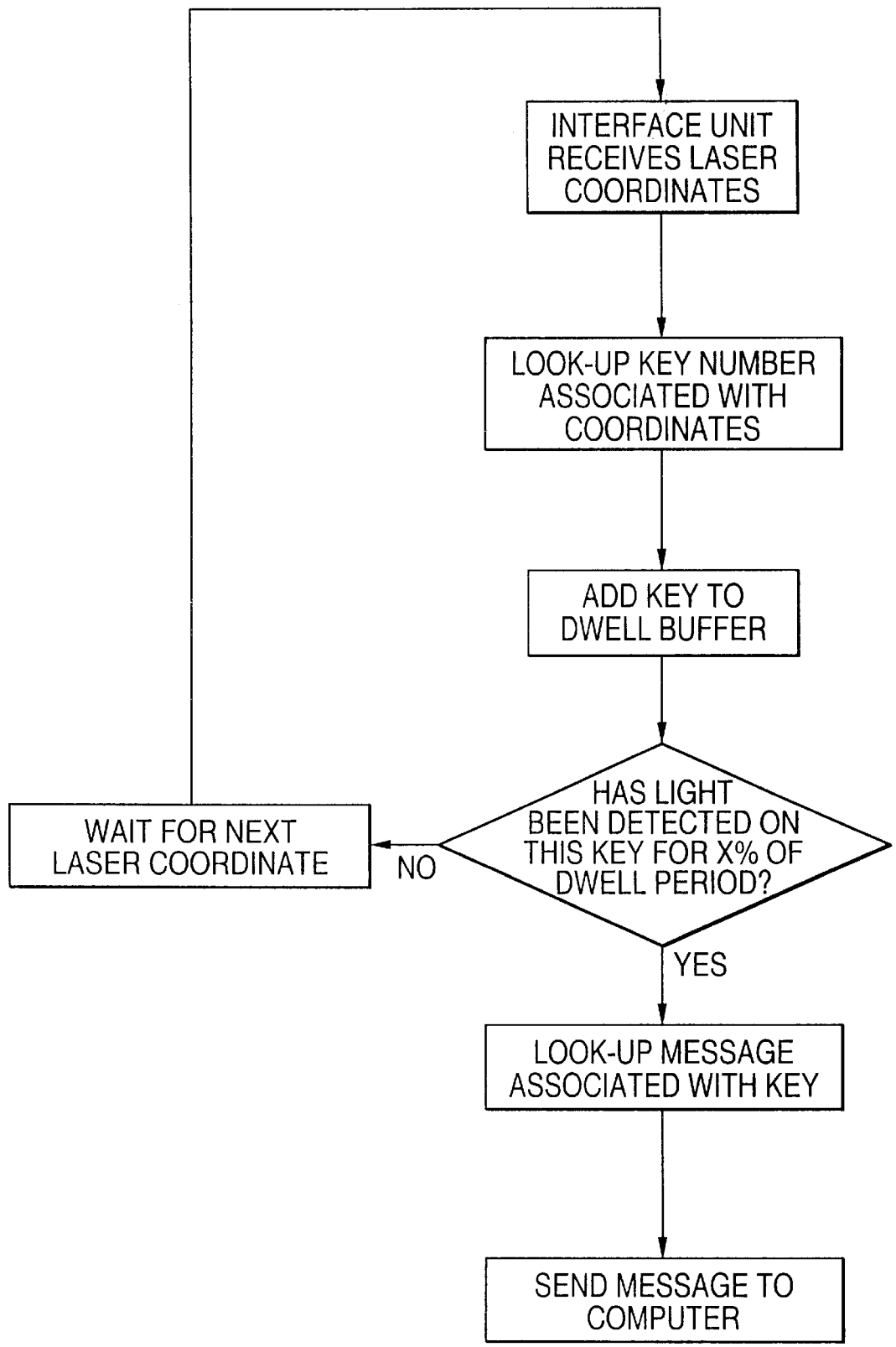
FIG. 12 is a schematic flow diagram of the manner by which the system assesses whether a successful keypress has been completed.

As explained more fully below, a user (not shown) wearing the headband 14 can point the beam 16 toward and to the lightreceiving surface 22 of the laser keyboard 18 to illuminate a targeted sub-area of the light-receiving surface 22. When a targeted sub-area is successfully illuminated, the interface unit 24 outputs a message consisting of computer keyboard key presses and mouse movements to effect a command or other control in a manner analogous to a conventional keypress on the keyboard 36 and/or conventional mouse movement of mouse 37. As explained below in relationship to FIG. 12, a successful keypress occurs when the beam 16 illuminates the selected target area for a selected percentage of a predetermined dwell period (i.e., 80% of a 2 second period). In this way, a user who cannot use the conventional keyboard 36 can nonetheless use the laser pointer 12 and the laser keyboard 18 to achieve the same functional result as using the keyboard 36.

Figure 2:
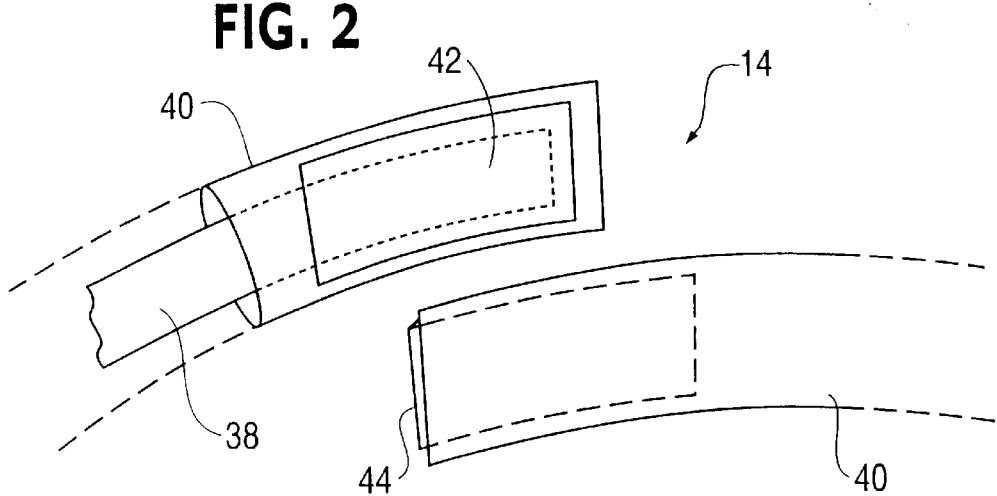
FIG. 2 is a partial perspective view of the end portions of a head band.

The laser pointer 12 is a conventional semiconductor laser that outputs a narrow collimated beam in the red portion of the optical spectrum. The headband 14 is of an open-hoop configuration to allow the headband 14 to be circumferentially mounted on the user's head, adjusted for size, and held in place. As shown in FIG. 2, the headband 14 is preferably fabricated with a phosphor-bronze support/stiffening strip 38 within a sewn fabric covering 10. A hook-strip 42 cooperates with a complementary loopstrip 44 to adjustably secure the ends of the headband 14 together. The laser pointer 12 is attached to the headband 14 by a simple band clamp (not shown) or similar structure.

Figure 3:
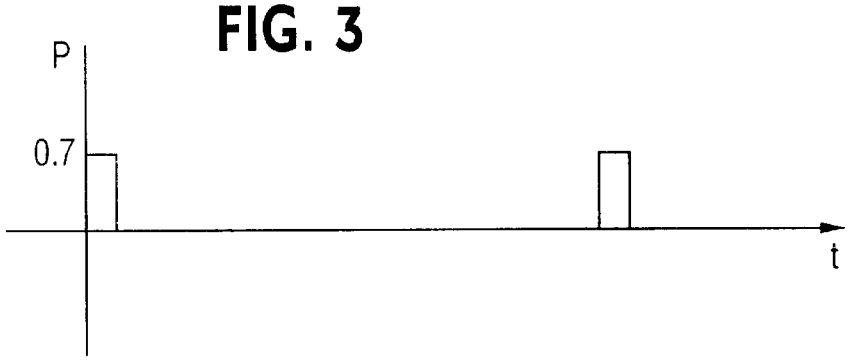
FIG. 3 is a graphical representation of the power output of a laser in its low power mode.
Figure 4:
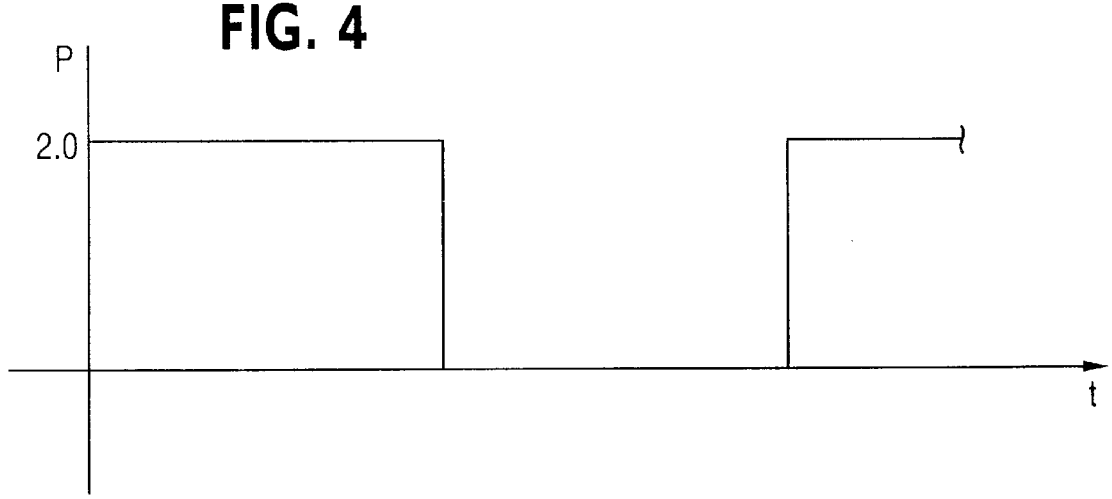
FIG. 4 is a graphical representation of the power output of a laser in its higher-power mode.

As explained more fully below, the laser pointer 12 outputs a collimated beam 16 that is pulse modulated to provide either a low-power signal or a higher-power signal in accordance with a conditioned power signal provided through the power/control cord 20 and under the control of the laser keyboard 18. As shown in FIG. 3, the low-power signal in the preferred embodiment is defined by 0.7 milliwatt pulses, each of a 40 microsecond duration, repeating at a 36 pulse per second repetition rate with an approximate 27 millisecond spacing between each pulse. The low-power signal provides an effective power output of about 1 microwatt; this level is believed to provide a reasonable degree of retinal safety for the unprotected eye. As shown in FIG. 4, the higher-power signal is defined by 2.0 milliwatt pulses, each of a 500 microsecond duration, recurring at a 1000 pulse per second repetition rate (i.e., a 50% duty cycle). The higher-power signal provides an effective power density of about 1 milliwatt. Compared to the higher-power signal, the low-power signal appears as relatively sparse, short-duration pulses. As explained more fully below, the low-power signal is used during an "laser acquisition mode" (LAM) during which the user is attempting to illuminate a portion of the light receiving surface 22 of the laser keyboard 18, and the higher-power mode is used during a captured-signal mode (CSM) when a portion of the light-receiving surface 22 of the laser keyboard 18 has been successfully illuminated by the user.

Figure 5:
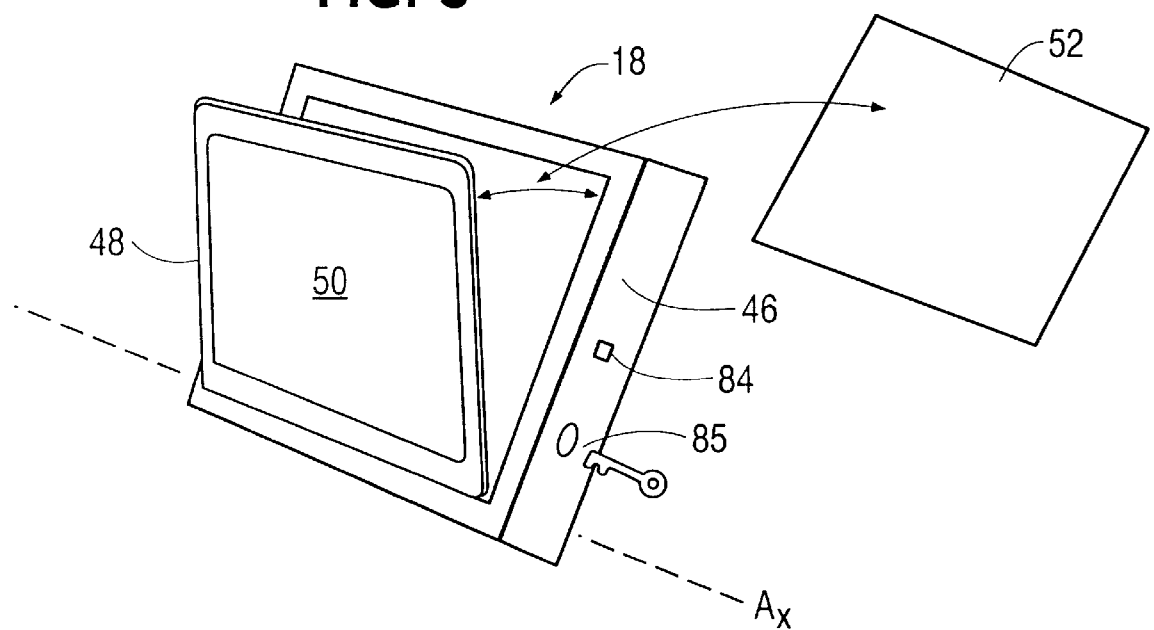
FIG. 5 is a perspective view of a laser keyboard with its cover in the opened position.
Figure 6:
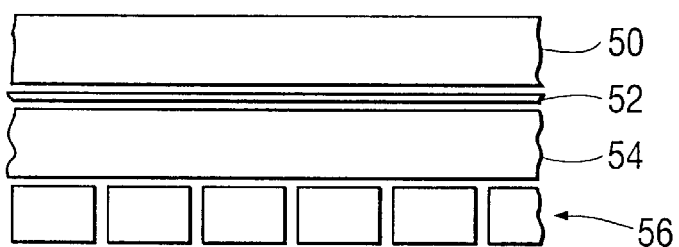
FIG. 6 is a schematic cross-sectional view of the various devices of the laser keyboard.
Figure 7:
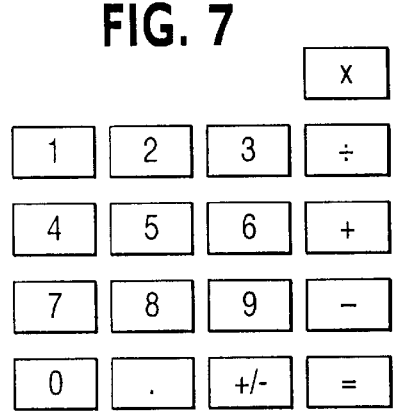
FIG. 7 is a graphical representation of an exemplary overlay for use with the laser keyboard.

As shown in FIG. 1 and in FIG. 5, the laser keyboard 18 is formed as a rectangular parallelipiped housing 46 having a cover 48 that pivots away from the housing 46 about an axis $A_x$ to insert paper overlays, as described more fully below. As shown in FIG. 6, the laser keyboard 18 includes a frosted light-transmitting plastic window 50, the light-transmitting overlay 52 (typically drafting vellum), an optical filter 54, and, lastly, a photosensitive array 56 for sensing the beam 16. The plastic window 50 is mounted in the cover 48, and, as shown in FIG. 5, folds or pivots outwardly from the optical filter 54 when the laser keyboard 18 is opened. As explained below, the plastic window 50 is "frosted," i.e., the entry surface is provided with a surface roughness so that the reflected light from the beam 16 is diffused insuring eye safety. The overlay 52 is typically made from a non-opaque, light-transmitting drafting vellum or similar material and carries alpha/numeric characters, graphical symbols, or other illustrations used in providing commands to the system computer 26. For example and as shown in FIG. 7, the overlay 52 can include a simplified version of a standard calculator; other symbols or patterns can include the alphanumeric keyboard, special symbols, or even a graphic of an animal. The present invention is particularly well-suited for use with contemporary software packages that display graphic images 13 in which selected sub-areas constitute "hot spots" that respond to a mouse click to effect control of the program. In general, the overlays 52 can be prepared on light transmitting paper or vellum by freehand sketching, by computer graphics/drawing packages or by capturing a particular screen of a software package and printing the screen on a conventional monochrome and/or polychrome printer. A suitable software package for creating overlays for the preferred embodiment is the LaserKeys software package available from InvoTek, Inc. of Alma, AR 72921. As shown in FIG. 5, the overlay 52 can be conveniently removed and replaced by pivoting the cover 48 forwardly of the housing 46 and inserting or removing an overlay 52 as desired.

In the case of the preferred embodiment, the optical filter 54 is designed to preferentially transmit the particular frequency of the beam 16, i.e., red in the case of the preferred embodiment, while excluding light at wavelengths that are longer or shorter than those at the red end of the optical spectrum. The optical filter 54 thus improves the overall signal-to-noise ratio of the system by preferentially transmitting light from the beam 16 while attenuating light from other sources that could represent noise.

Figure 8:
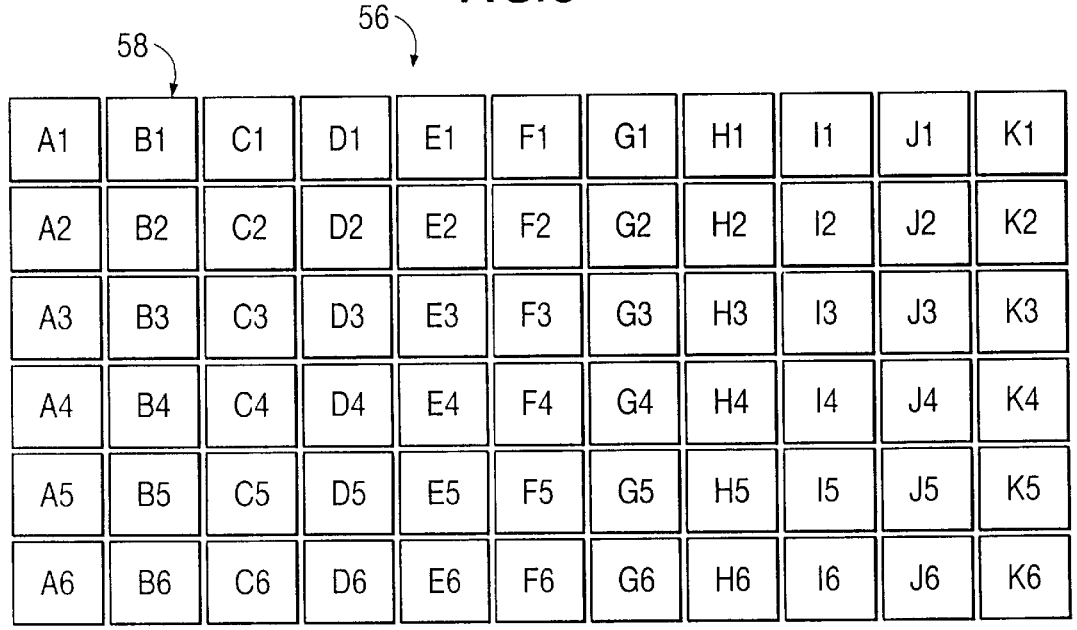
FIG. 8 is a plan view of the logical grouping of photosensors that make up the photosensitive surface.
Figure 9:
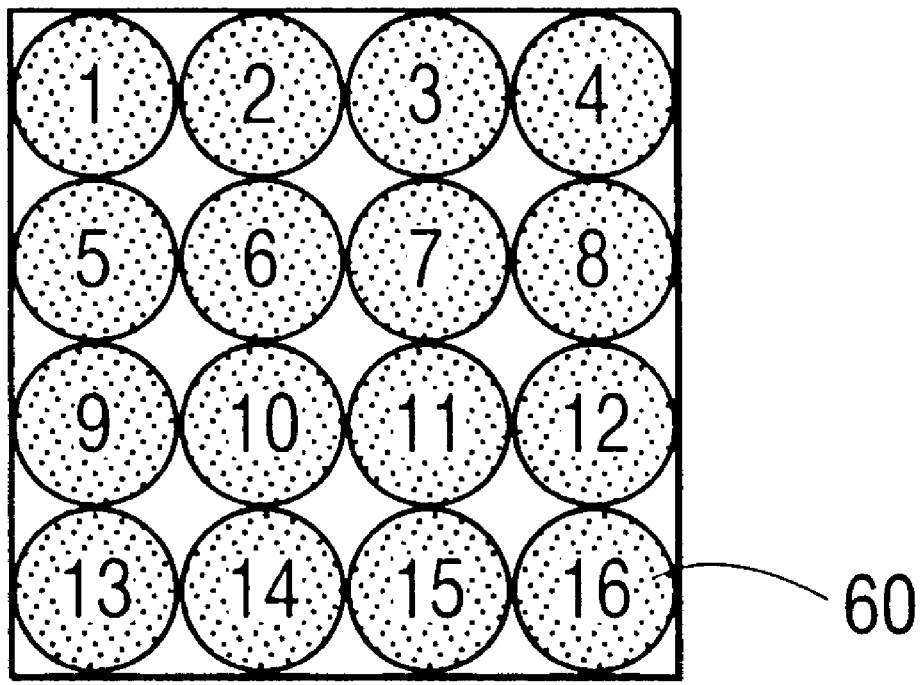
FIG. 9 is a plan view of the photosensors that make up a logical group illustrated in FIG. 8.

As shown in FIG. 8, the photosensitive array 56 is defined by a rectangular array of rows (rows 1 through 6) and columns (columns A trough K) of photosensor groups 58 for a total of sixty-six photosensor groups 58. The size of the photosensitive array 56 is arbitrary and the number of rows and columns can be increased or decreased in accordance with the needs of a particular application. As shown in FIG. 9, each photosensor group 58 is defined by a 4×4 array of sixteen individual lightcells 60. In the preferred embodiment, the individual lightcells 60 are photoresistive cells having a diameter of about 0.3 inches and use cadmium sulfide (CdS) as the photoresistive material. As can be appreciated by those skilled in the art, other types of photo-responsive cells are equally suited, these other types of photoresponsive cells include, for example, photovoltaic cells, photodiodes, and phototransistors. The various photo-responsive cells are electrically connected in a row/column fashion so that the resistive state of the lightcells 60 at the intersection of any row/column can be easily determined. In practice and as explained the various photosensors 58 undergo periodic and recurring scanning under the control of the laser keyboard 18.

FIG. 6 illustrates the optical functions of the various components of the laser keyboard 18. When the beam 16 is directed to and illuminates a portion of the laser keyboard 18, the beam 16 passes through the frosted entry surface of the plastic window 50. The frosted surface of the plastic window 50 serves to diffract any light reflected off the entry surface of the plastic window 50 and thus minimizes the possibility of reflected laser light causing retina damage. After passing through the frosted surface of the plastic window 50, a portion of the beam is transmitted through the paper overlay 52, as well as the optical filter 54, and undergoes a measure of beam widening. The amount of beam widening is determined by the thickness of the optical filter 54. In the preferred embodiment, the thickness of optical filter 54 is selected to be 0.125 inches thick, producing beam widening to about 0.3×0.3 inches when the beam reaches photosensor 60. Beam widening is desirable since it is impossible to avoid spaces between adjacent photosensors 60, and photoresponsive devices will occasionally have light-receiving portions thereof that are less sensitive than other portions, including light-receiving portions that are non-responsive (i.e. "dead" spots).

Figure 10A:
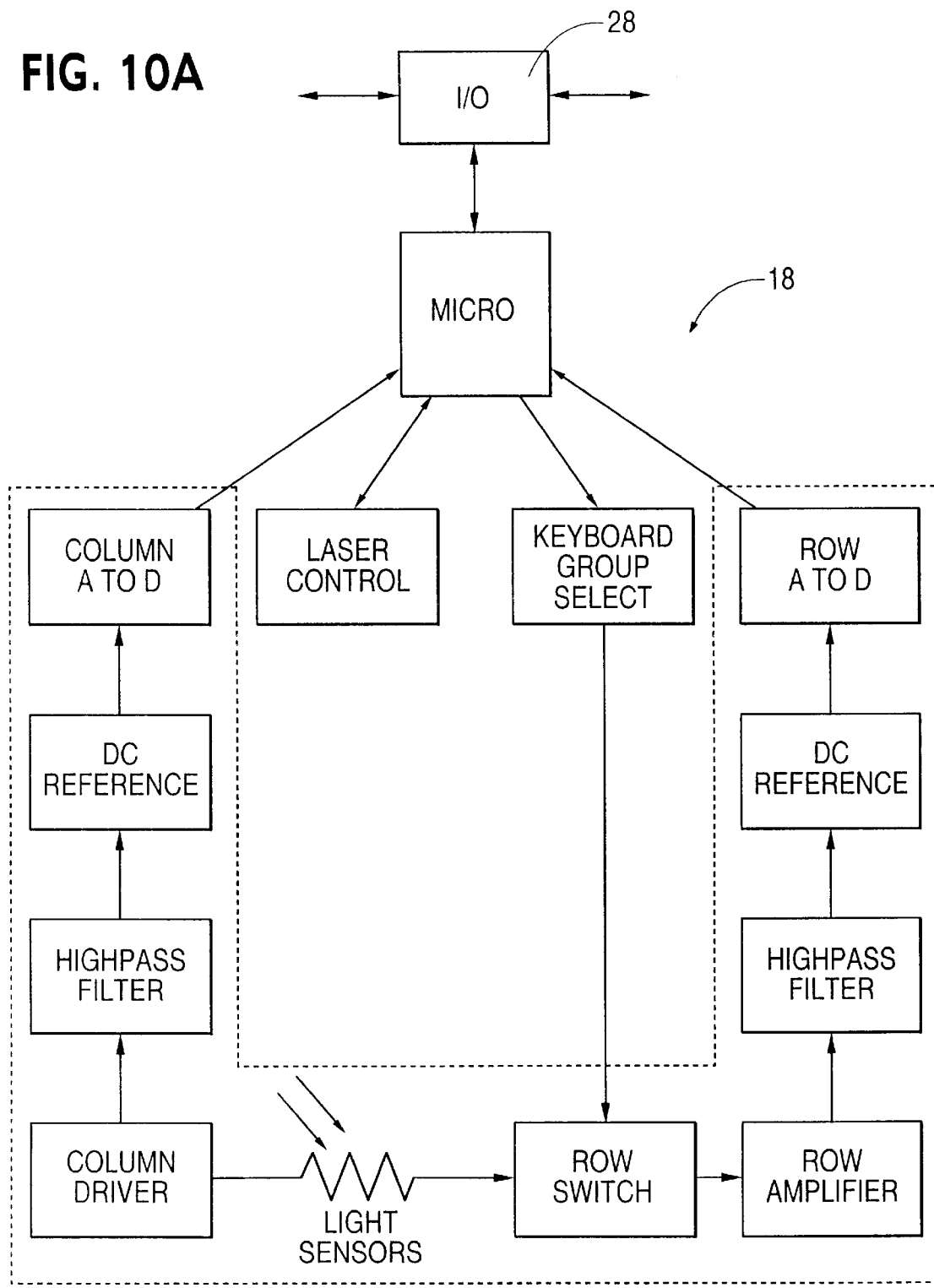
FIG. 10A is a schematic block diagram of the laser keyboard.
Figure 10B:
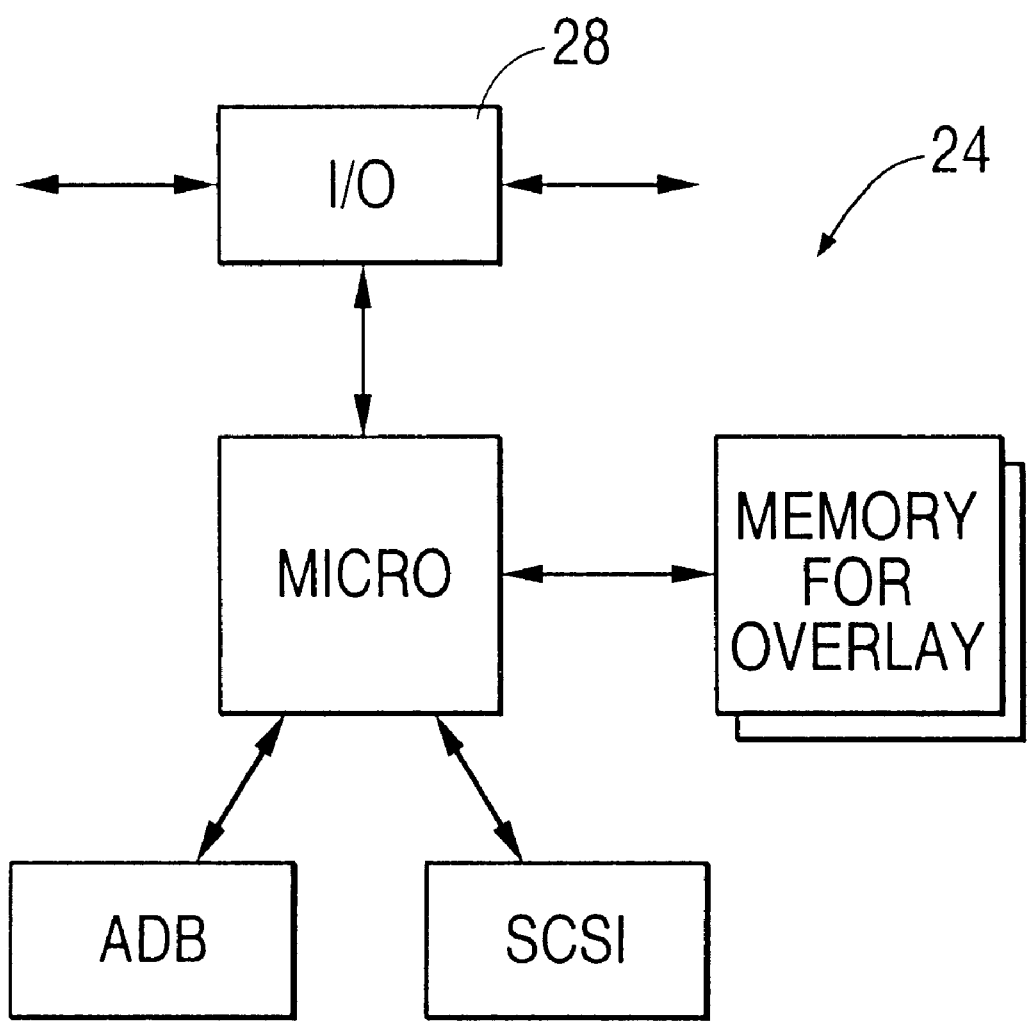
FIG. 10B is a schematic block diagram of the interface unit.

The laser keyboard 18 is designed to control the output of the laser pointer 12, decode the coordinates of the laser beam 16 on the photosensitive array 45, and transmit laser position data to the interface unit 24. As shown in the function diagram of FIG. 10A, the laser keyboard 18 includes a microprocessor 62 that interfaces with the interface unit 24 through I/O port 28, a laser control function 64, a group select function 66, a column select function 68, and a row select function 70. The column select 68 and the row select 70 functions include, respectively, a column driver 72 and a row amplifier 74 with both the column select 68 and the row select 70 functions including respective DC voltage reference 76 and high-pass filter functions 78. Additionally, a group select function 66 selects row switches 82 under the control of the microprocessor 62. The laser control function 64 operates to supply power necessary for the low-power and higher-power operational modes of the laser pointer 12 as well as to turn the laser pointer 12 off. The pulse modulation of the beam 16 can be accomplished, for example, by timing signals provided by the microprocessor 62 or by a suitably configured multivibrator. The individual lightcells 60 are connected between the respective column drivers 72 and the associated row switches 82. The high-pass filters 78 are designed to selectively pass frequencies in the 1000 pulse/second repetition rate of the higher-power mode (FIG. 4) while attenuating frequencies below this repetition rate. Modulating the higher-power mode at a selected frequency and using a high-pass filter 78 assures that background noise will have limited affect on the system 10. Since most background illumination occurs at frequencies much less than the 1-kilohertz modulation frequency preferred for the present invention, a higher level of operational reliability is assured during a laser acquisition mode and a captured signal mode. The microprocessor 62 can thus select any photosensor group 58 for evaluation to determine if the beam 16 is illuminating any lightcell 60 in the photosensor group 58.

As explained below in relationship to FIGS. 11A and 11B, the microprocessor 62 operates in a laser acquisition mode (LAM) in which a 2×2 matrix of photosensor groups 58 are selected (e.g., photogroups A1, A2, B1, B2 in FIG. 8) and sensed to see if any one sensor 60 is being irradiated by the beam 16. Successive 2×2 matrices of photogroups 58 (e.g., C1, C2, D1, D2, in FIG. 8) are thereafter scanned in the search for the beam 16. The 2×2 size of the matrix is arbitrary and can be larger or smaller than that used in the preferred embodiment. Once the beam 16 is detected, the system enters the capture signal mode during which a determination is made if a specific area is being intentionally targeted by the user.

Figure 11:
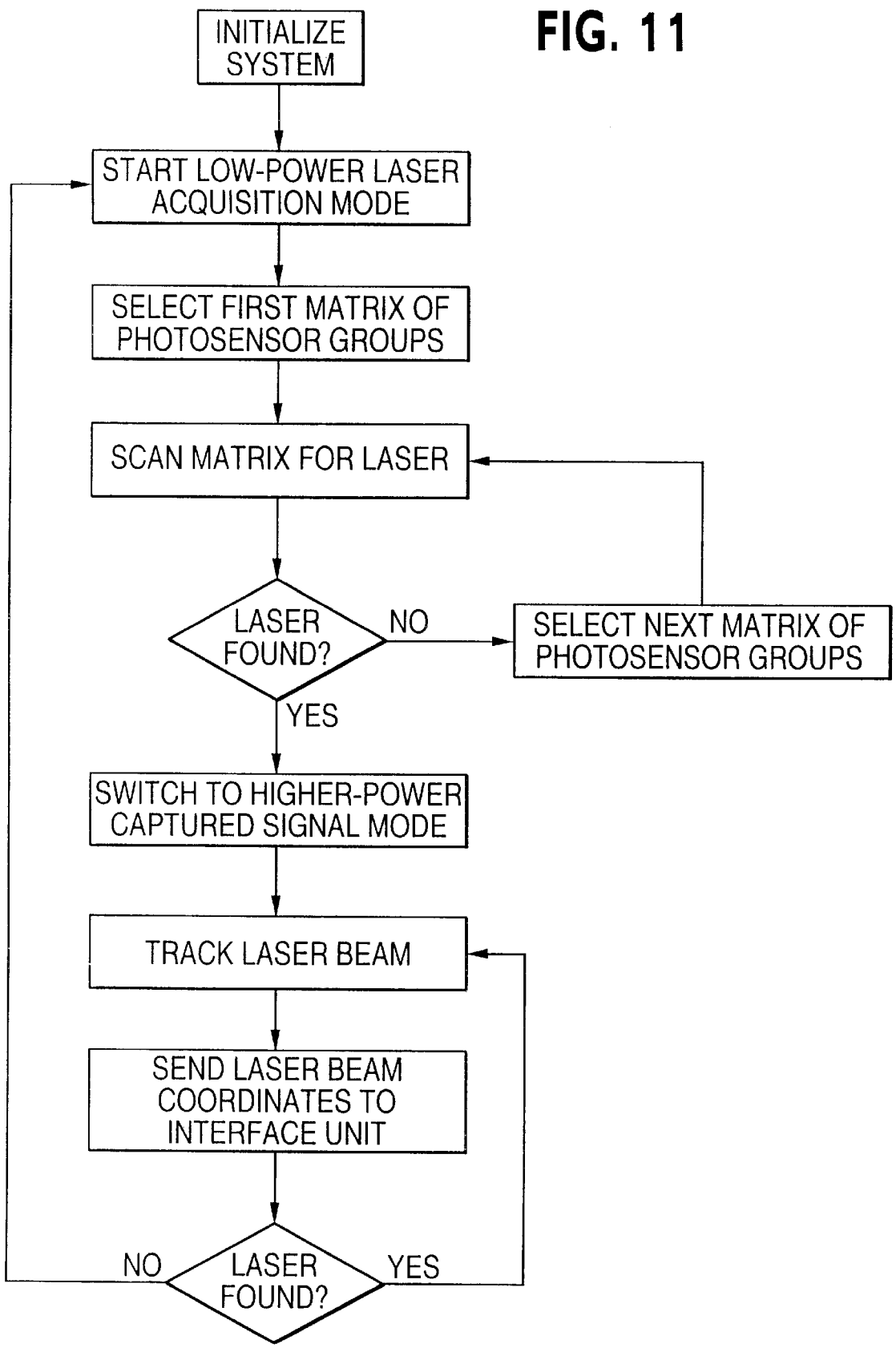
FIG. 11 is a schematic flow diagram of the major operational sequence of the system during both its laser acquisition mode and its captured signal mode.

The laser acquisition mode is generically illustrated in FIGS. 11A and 11B. After the system 10 is initialized, the laser pointer 12 is energized in the low-power mode (FIG. 3) and the matrix scanning sequence is started. The first matrix (i.e., A1, A2, B1, B2) is selected (i.e., enabled) and a determination made by the microprocessor 62 if the beam 16 has, or has not, been detected. If the beam 16 has not been detected, the firmware sequences through all remaining matrices and continues sequencing until the beam 16 is detected. Sequencing can be controlled by a simple counter arrangement, as shown in FIGS. 11A and 11B, or by pre-stored table look-up or by an instruction map. If the beam 16 is detected, the output of the laser pointer 12 is switched to its higher-power mode (FIG. 4) and the keyboard scanning is switched to a beam tracking mode. More specifically, the keyboard group select 66 is controlled to follow the beam 16 as it moves across the keyboard surface 56. For example, if the system detects the beam's presence in matrix A1, A2, B1, B2, the beam intensity is switched to the higher intensity mode. As the laser moves to a position half-way across photogroup B1 towards C1, the system tracks the beam and enables matrix B1, B2, C1, C2. If the beam moves halfway across C1 towards D1, the system tracks the beam and enables matrix C1, C2, D1, D2. Beam movements back to the left (e.g. the user targets the left half of C1) cause the matrix to shift back to B1, B2, C1, C2. An equivalent tracking occurs vertically, e.g. when the beam moves to the bottom half of A1, A2, B1A3C2 towards A3 (or B3) the system enables matrix A2, A3, B2, B3. If the system loses track of the laser for any reason, it immediately places the laser back into the low-intensity mode and begins its search mode, scanning blocks sequentially. As the laser keyboard 18 tracks the beam 16, it transmits the coordinates of the beam to the interface unit 24 through the I/O port 28. The interface unit 24 includes a subroutine (FIG. 12) to determine if the beam 16 has been targeting a graphic (or "key") on the paper overlay. The definition of how "keys" map on to the laser keyboard surface 56, as well as key activation parameters, are sent to the interface unit 24 by the system computer 26 through the Small Computer Systems Interface (SCSI) bus. More specifically, an arbitrary activation time "window" is selected (i.e., 0.5 seconds to 2.5 second) during which the beam 16 must be on-target for some selected percentage (e.g., 60%, 70%, 80%, 100%) of the activation time window. The use of a percentage-on target time during the activation time-window allows the user to "slip-off" the target area without having to reinitiate the targeting of the desired area. This feature takes into consideration and accommodates possible targeting disabilities on the part of the user. Once the interface unit 24 calculates that the beam has targeted a laser keyboard location for the required time, the computer message associated with the location is output to the system computer 26. The message may contain a single character, a control-character combination, a character string, a mouse movement, or any combination of the aforementioned, and is defined by the user using the LaserKeys software during the overlay definition process. Thus a single laser "key" can be interpreted by the interface unit 24 as a single letter or number, a CTRL-letter command, a mouse movement, a much larger character string, or a combination of characters and mouse movements.

In addition to sending information to the computer, the interface unit 24 can also send a command to the laser keyboard 18. One example of a command to the laser keyboard 18 is to activate the laser beam 16 in the higher intensity mode for a user selectable amount of time, regardless of whether it is pointing at the light sensor surface 56. This feature allows responsible users to take advantage of the ambient pointing capabilities of the laser for a short period of time before automatically returning to the low-intensity mode. Since this feature has the potential to be dangerous, it is important that it only be used by people who are capable of understanding the risks and who are also physically able to insure that the laser is not targeted at a person's eye. To assist in assuring safety, the laser keyboard 18 includes a lock-and-key enable switch 85. When this switch is in the disabled position, it is impossible for the user to activate the laser pointer mode. When this switch is in the enabled position, the user can define an area on the light sensitive surface 56 as the "activate laser pointer" command.

When this area is targeted, the laser will remain in the higher intensity mode for several seconds, as determined by the LaserKeys application during the overlay definition process, before automatically returning to the low-intensity mode.

The laser keyboard 18 includes a user-operable switch port 84 (FIG. 5) that allows the user to use a "point and click" approach to accessing the laser keyboard. When using a switch, the user points the laser beam 16 at the desired location on the sensor surface 56 and then activates the switch connected to the switch port 84. The interface unit 24 immediately sends the message associated with the beam location to the computer (or, if appropriate, enable the laser pointer mode). This mode bypasses the dwell-time selection process, making it faster for users who are able to target the laser quickly and accurately on the sensor surface 56 to access the system computer 26.

The present invention advantageously provides a laser actuated keyboard system in which the laser pointer is provided with a retina-safe power output during a laser acquisition mode and a higher-power output during a captured-signal mode to limit the higher-power mode to those instances during which the laser keyboard is being targeted, or the user specifically enables the laser pointer for briefly pointing into the environment.

As will be apparent to those skilled in the art, various changes and modifications may be made to the illustrated laser actuated keyboard system of the present invention without departing from the spirit and scope of the invention as determined in the appended claims and their legal equivalent.

What is claimed is:

1. A laser actuated keyboard system comprising:
   a user pointable light source emitting a light beam pointable by a user to a target;
   light-responsive means sensitive to the light beam emitted by said light source and having one or more light-sensing areas, said one or more light-sensing areas providing an electrical signal responsive to illumination by the light beam when targeted by the user, said light-responsive means providing an electrical output identifying a light-sensitive area illuminated by the light beam; and
   means for modulating the light beam emitted by said light source to provide (1) a first average power signal when the user is not targeting said light-responsive means and (2) a second average power signal when the user targets said light-responsive means.

2. The laser actuated keyboard system of claim 1, further comprising a general purpose computer connected to said light-sensitive means for receiving the electrical output identifying a light-sensitive area illuminated by the light beam.

3. The laser actuated keyboard system of claim 2, wherein said light sensitive means converts the electrical identifying output into a keyboard input and/or a coordinate input equivalent.

4. A laser actuated keyboard system of claim 1, wherein said first average power signal is lower than said second average power signal.

5. A laser actuated keyboard system of claim 4, wherein said light beam is pulse modulated at a frequency above about 120 Hz to provide said second average power signal.

6. A laser actuated keyboard system of claim 4, wherein said light beam provides said first average power signal having an average luminous power of less than about 10 microwatts.

7. The laser actuated keyboard system of claim 1, wherein said light-responsive means provide an electrical output identifying a light-sensing area illuminated by the light beam when said light-sensing area is illuminated for at least a selected percentage of a predetermined time period.

8. The laser actuated keyboard system of claim 1, further comprising a selection switch, said selection switch being able to be independently activated by the user at a time when a specific one of said light sensing area is illuminated, wherein said light-responsive means provides an electrical output identifying the light-sensitive area illuminated by the light beam upon activation of said selection switch.

9. A laser actuated keyboard system comprisng:
   a user pointable light source emitting a light beam pointable by a user to pointable by a user to illuminate a target;
   means for controlling the power output of said light source between a first power output average level and a second power output level that is higher than the first power output average level;
   light-responsive means sensitive to the light beam emitted by said light source and having one or more light-sensing areas, said one or more light-sensing areas providing an electrical signal responsive to illumination by the light beam when targeted by the user,
   means for detecting the illumination of one or more of said light-sensitive areas when said light source is in its first power output level and for switching the light source to its second power output level in response to said detection; and
   said light-responsive means providing an electrical output identifying a light-sensing area illuminated by the light beam.

10. The laser actuated keyboard system of claim 9, further comprising a general purpose computer connected to said light-sensitive means and for receiving the electrical output identifying a light-sensitive area illuminated by the light beam.

11. The laser actuated keyboard system of claim 10, wherein said light sensitive means converts the electrical output into a keyboard-input and/or coordinate input equivalent.

12. A laser actuated keyboard system of claim 9, wherein said light beam is pulse modulated at a frequency above about 120 Hz at said second power output average level.

13. A laser actuated keyboard system of claim 9, wherein said light beam has an average luminous power of less than about 10 microwatts at said first output power average level.

14. The laser actuated keyboard system of claim 9, wherein said light-responsive means provides an electrical output identifying a light-sensing area illuminated by the light beam when said light-sensing area is illuminated for at least a selected percentage of a predetermined time period.

15. The laser actuated keyboard system of claim 9, further comprising a selection switch, said selection switch being able to be independently activated by the user at a time when a specific one of said light sensing area is illuminated, wherein said light-responsive means provides an electrical output identifying the light-sensitive area illuminated by the light beam upon activation of said selection switch.

16. A laser actuated keyboard system comprising:
   a user pointable light source emitting a light beam pointable by the user to illuminate a target;
   means for controlling the power output of said light source between a low-power average mode and a higher-power average mode;
   means for modulating the light beam emitted by said light source at a selected modulation frequency;
   light-responsive means sensitive to the light beam emitted by said light source and having one more light-sensing areas, said one or more light sensing areas providing an electrical signal responsive to illumination thereof by the light beam when targeted by the user, said one or more light-sensing areas having detecting means for detecting the illumination when said light source is in its low-power average mode and for switching the light source to its higher-power average mode in response to said detection, said detecting means having a frequency filter for preferentially passing an electrical signal of the selected modulation frequency; and
   said light-responsive means providing an electrical output identifying a light-sensing area illuminated by the light beam.

17. The laser actuated keyboard system of claim 16, further comprising a general purpose computer connected to said light-sensitive means and for receiving the electrical output identifying a light-sensitive area illuminated by the light beam.

18. The laser actuated keyboard system of claim 17, wherein said light sensitive means converts the electrical identifying output into a keyboard-input and/or coordinate input equivalent.

19. A laser actuated keyboard system of claim 16, wherein said light beam is pulse modulated at a frequency greater than about 120 Hz at said higher power average mode.

20. A laser actuated keyboard system of claim 16, wherein said light beam has an average luminous power of less than about 10 microwatts at said low power average mode.

21. The laser actuated keyboard system of claim 16, wherein said light-responsive means provides an electrical output identifying a light-sensing area illuminated by the light beam when said light-sensing area is illuminated for at least a selected percentage of a predetermined time period.

22. A laser actuated keyboard system comprising:
   a user pointable light source emitting a light beam pointable by a user to a target;
   light-responsive means sensitive to the light beam emitted by said light source and having one or more light-sensing areas, said one or more light-sensing areas providing an electrical signal responsive to illumination by the light beam when targeted by the user;
   means for modulating the light beam emitted by said light source at a selected frequency, wherein said light beam is modulated to provide a first average power signal when the user is not targeting said light-responsive means, and wherein said light beam is modulated to provide a second average power signal when the user targets said light-responsive means; and
   a frequency filter for (1) receiving the electrical signal from said one or more light-sensing areas and (2) preferentially passing an electrical signal of the selected modulation frequency.

23. A laser actuated keyboard system of claim 22, wherein said light beam is pulse modulated at a frequency greater than about 120 Hz to provide said higher average power signal.

24. A laser actuated keyboard system of claim 22, wherein said light beam provides said first average power signal having an average luminous power of less than about 10 microwatts.

* * * * *